United States Patent
Mukaiyama et al.

(10) Patent No.: US 11,882,253 B2
(45) Date of Patent: Jan. 23, 2024

(54) POWER SAVING CONTROL FOR IMAGE FORMING APPARATUS WITH POST PROCESSING FUNCTIONS

(71) Applicant: SHARP KABUSHIKI KAISHA, Sakai (JP)

(72) Inventors: Daisuke Mukaiyama, Sakai (JP); Nobuyuki Ueda, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/072,591

(22) Filed: Nov. 30, 2022

(65) Prior Publication Data

US 2023/0179722 A1    Jun. 8, 2023

(30) Foreign Application Priority Data

Dec. 7, 2021 (JP) .................................. 2021-198732

(51) Int. Cl.
*H04N 1/00* (2006.01)

(52) U.S. Cl.
CPC ..... *H04N 1/00891* (2013.01); *H04N 1/00639* (2013.01); *H04N 1/00689* (2013.01); *H04N 1/00694* (2013.01); *H04N 1/00896* (2013.01)

(58) Field of Classification Search
None
See application file for complete search history.

(56) References Cited

U.S. PATENT DOCUMENTS

| 9,454,121 | B2 | 9/2016 | Hikichi | |
| 10,527,997 | B2 | 1/2020 | Hikichi | |
| 10,948,865 | B2 | 3/2021 | Hikichi | |
| 2015/0310320 | A1* | 10/2015 | Yamaguchi | H04N 1/00907 358/1.13 |
| 2015/0323894 | A1* | 11/2015 | Hikichi | B65H 37/04 399/88 |
| 2016/0352946 | A1* | 12/2016 | Eguchi | G06K 15/4055 |
| 2020/0374414 | A1* | 11/2020 | Hibino | H04N 1/00904 |

FOREIGN PATENT DOCUMENTS

| CN | 110266905 B | 9/2019 |
| EP | 2942669 B1 | 11/2015 |
| JP | 6381275 B2 | 8/2018 |
| KR | 102183757 B1 | 11/2020 |

* cited by examiner

*Primary Examiner* — Eric A. Rust

(74) *Attorney, Agent, or Firm* — ScienBiziP, P.C.

(57) ABSTRACT

An image forming apparatus includes: a post-processor including a sheet detection circuit detecting a sheet inserted in a sheet insertion opening for manual stapling, a staple mechanism executing stapling processing on the sheet, and a drive circuit actuating the staple mechanism; a post-processing controller operating the drive circuit in response to detection of the sheet; a power circuit supplying power to the drive circuit and another circuit in the apparatus; and a power saving controller shutting off a power supply from the power circuit to the drive circuit and the other circuit and shifting from a normal mode to a power saving mode when a shifting condition is satisfied. Prior to shifting, the power saving controller checks the post-processing controller whether the stapling processing is currently executed, and, when the stapling processing is not currently executed, instructs prohibition of the stapling processing and shifts to the power saving mode.

7 Claims, 8 Drawing Sheets

POWER SAVING CONTROL FOR IMAGE FORMING APPARATUS WITH POST PROCESSING FUNCTIONS

BACKGROUND OF THE INVENTION

Field of the Invention

The present disclosure relates to an image forming apparatus having a manual stapling function and a function of shifting from a normal mode to a power saving mode, and a control method therefor.

Description of the Background Art

In recent years, increased awareness of energy problems and global environment has led to a demand for power saving in an image forming apparatus as one of electronic devices. Along with power saving of each element related to image formation, an auto power shutoff function has become widely available. The auto power shutoff function is a function to shut off a power supply to all devices in the apparatus except for some devices so as to suppress power consumption in a standby state in the case where the image forming apparatus remains unused for a predetermined period (five minutes as an example). The auto power shutoff function is also a function that, in the case where approach of a user is detected, an operation on an operation unit is detected, or a document is set, such action triggers initiation (resumption) of the power supply and a mode is shifted from a power saving mode to a normal mode in which an image can be formed.

As the image forming apparatus such as a multifunction peripheral, the image forming apparatus with post-processing functions such as stapling, punching, and saddle stitching is available. A device that implements such post-processing functions is referred to as a post-processor or a finisher. Stapling includes a function referred to as manual stapling in addition to a function to staple printed sheets that are output by the image forming apparatus after a print job or a copy job (stapling in the job). The manual stapling is a function to staple the sheets when the user inserts the sheets in a sheet insertion opening that is provided to the finisher. The manual stapling can be said as a function to solely use a stapler of the post-processor. The manual stapling is processing that should be executed asynchronously with the job and triggered by the user's operation.

However, in the case where shifting to the power saving mode by the auto power shutoff and the trigger of the manual stapling occur simultaneously, such a situation possibly occurs where the power supply to the post processor is shut off in the middle of the stapling processing. In such a situation, the sheet may not be removed from the sheet insertion opening, or the sheet may be damaged.
The following technique has been known to prevent the stapling processing from being interrupted before completion due to shifting of the image forming apparatus to the power saving mode.
A detector, a controller, and a prohibition device are provided. The detector detects the sheet that is inserted in the sheet insertion opening for the manual stapling. The controller shifts the image forming apparatus to the power saving mode when a predetermined condition is satisfied. The prohibition device prohibits shifting to the power saving mode when another predetermined condition is satisfied. In the case where the detector detects the sheet, the prohibition device prohibits shifting of the image forming apparatus to the power saving mode on the basis of a detection result.

However, as described above, it is not easy to handle conflicting events such as shifting to the power saving mode and the trigger of the manual stapling without a contradiction.
For example, the sheet may be inserted in the sheet insertion opening in a short period from initiation of shifting to the power saving mode to shutoff of the power supply to the finisher. Since the sheet is not inserted in the sheet insertion opening before the initiation of shifting to the power saving mode, shifting to the power saving mode is not prohibited. At a time point when the insertion of the sheet in the sheet insertion opening is detected, shifting to the power saving mode has already been initiated, and it is not reasonable to undo the shifting processing that has been initiated. This is because shifting to the power saving mode is the processing that affects each of the devices in the image forming apparatus.
As a result, the finisher may be powered off in the middle of the stapling processing.
Furthermore, even in the case where the manual stapling is completed, shifting to the power saving mode is not initiated until the sheet is subsequently removed from the sheet insertion opening. In the case where such an erroneous detection is made that the sheet remains inserted in the sheet insertion opening due to a sticky note or a scrap of paper left in the opening, shifting to the power saving mode remains prohibited. As a result, such a strange phenomenon occurs that it is difficult to comprehend a causal relationship with the manual stapling.
The present disclosure has been made in view of circumstances as described above and therefore provides a method for appropriately handling a conflict between shifting to a power saving mode and a trigger of manual stapling.

SUMMARY OF THE INVENTION

The present disclosure provides an image forming apparatus that includes: a post-processor including a sheet detection circuit that detects a sheet inserted in a sheet insertion opening for manual stapling, a staple mechanism that executes stapling processing on the sheet, and a drive circuit that actuates the staple mechanism; a post-processing controller that operates the drive circuit in response to detection of the sheet; a power circuit that supplies power to the drive circuit and another circuit in the apparatus; and a power saving controller that shuts off a power supply from the power circuit to the drive circuit and the other circuit in the apparatus and shifts from a normal mode to a power saving mode when a predetermined shifting condition is satisfied. Prior to shifting from the normal mode to the power saving mode, the power saving controller checks the post-processing controller whether the stapling processing is currently executed, and, in the case where the stapling processing is not currently executed, the power saving controller instructs prohibition of the stapling processing and shifts to the power saving mode.

From a different perspective, the present disclosure provides a power saving control method for an image forming apparatus, and the power saving control method causes a controller of an image forming apparatus having a manual stapling function to: detect a sheet inserted in a sheet insertion opening for manual stapling; drive a drive circuit and execute stapling processing on the sheet in response to detection of the sheet; shut off a power supply to the drive circuit and another circuit in the apparatus to shift from a normal mode to a power saving mode when a predetermined shifting condition is satisfied; prior to shifting from the normal mode to the power saving mode, check a post-processing controller whether the stapling processing is currently executed; and instruct prohibition of the stapling processing and shift to the power saving mode in the case where a result of the checking indicates that the stapling processing is not currently executed.

In the image forming apparatus according to the present disclosure, prior to shifting from the normal mode to the power saving mode, the power saving controller checks the post-processing controller whether the stapling processing is currently executed, and, in the case where the stapling processing is not currently executed, the power saving controller shifts to the power saving mode, Therefore, it is possible to appropriately handle a conflict between shifting to the power saving mode and a trigger of the manual stapling.

The power saving control method according to the present disclosure also exerts the same operational effect.

DESCRIPTION OF THE PREFERRED EMBODIMENTS

A further detailed description will hereinafter be made on the present disclosure with reference to the drawings. The following description is illustrative in all respects and should not be construed as limiting the present disclosure.

First Embodiment

Configuration of Image Forming Apparatus Having Manual Stapling Function

First, a description will be made on a configuration of an image forming apparatus having a manual stapling function.

Figure 1:
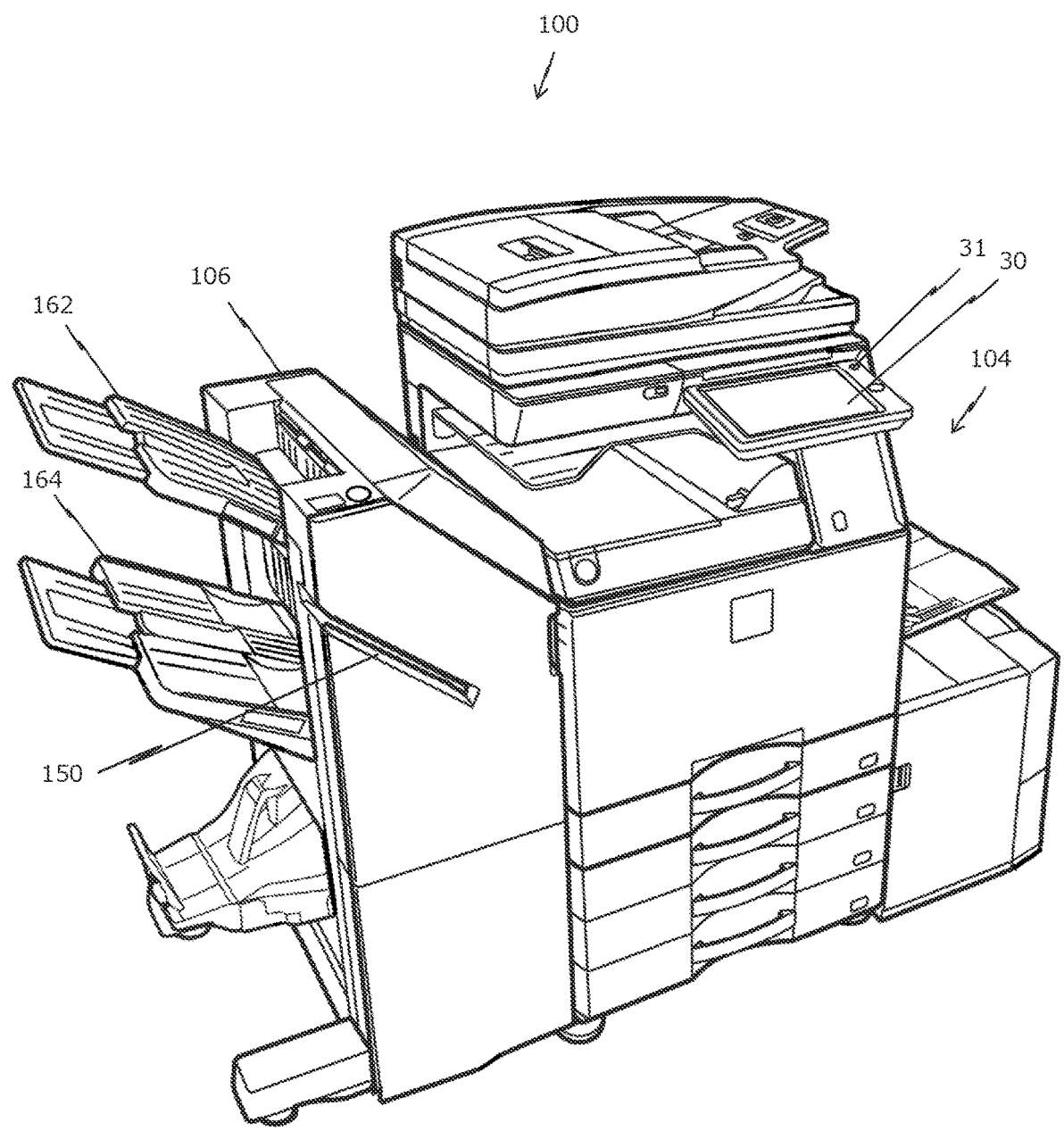
FIG. 1 is a perspective view illustrating external appearance of a multifunction peripheral including a finisher as one aspect of an image forming apparatus in an embodiment.

FIG. 1 is a perspective view illustrating external appearance of a multifunction peripheral including a finisher as one aspect of the image forming apparatus in this embodiment.

Figure 2:
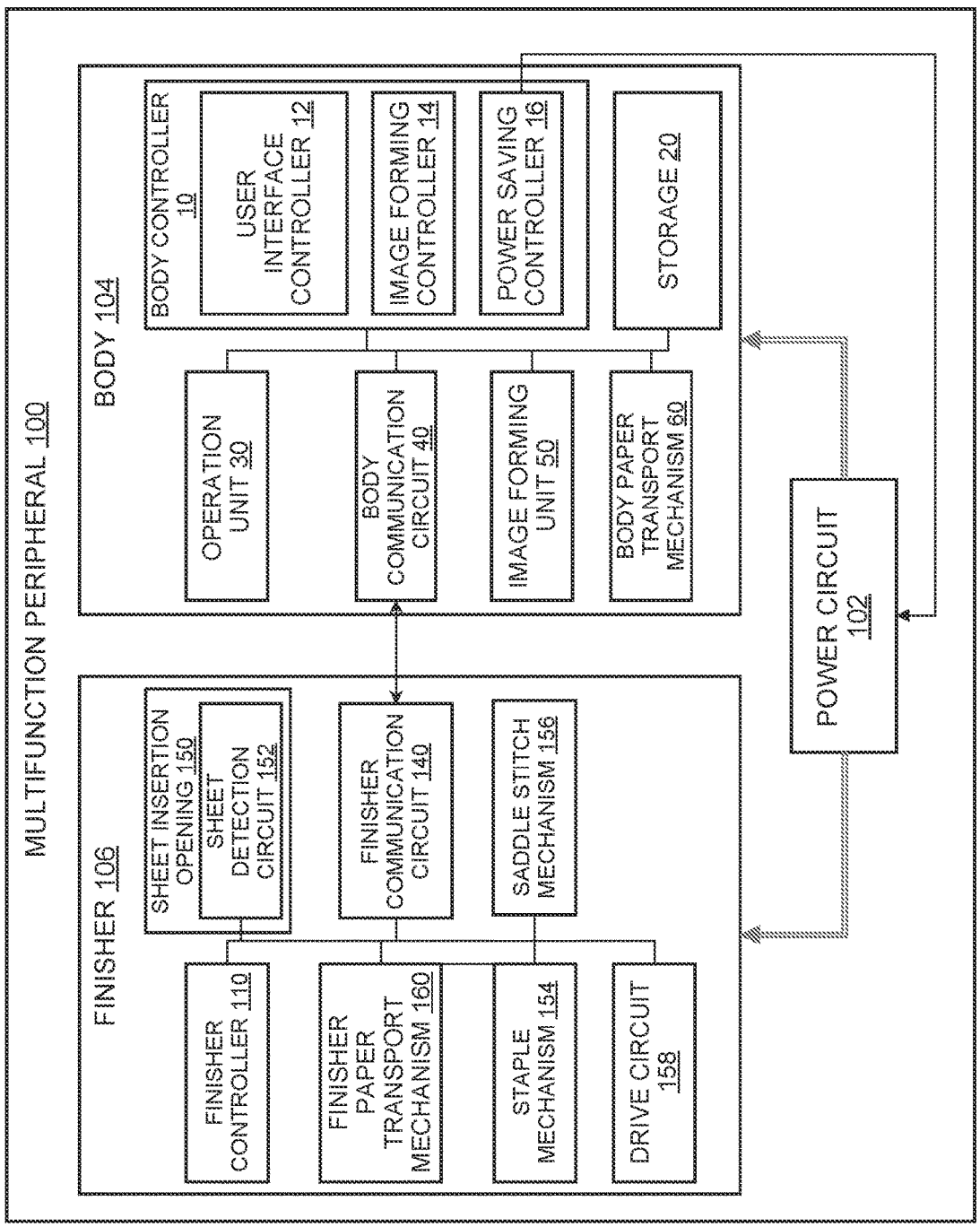
FIG. 2 is a block diagram illustrating a configuration of the image forming apparatus illustrated in FIG. 1.

FIG. 2 is a block diagram illustrating the configuration of the image forming apparatus illustrated in FIG. 1.

Figure 3:
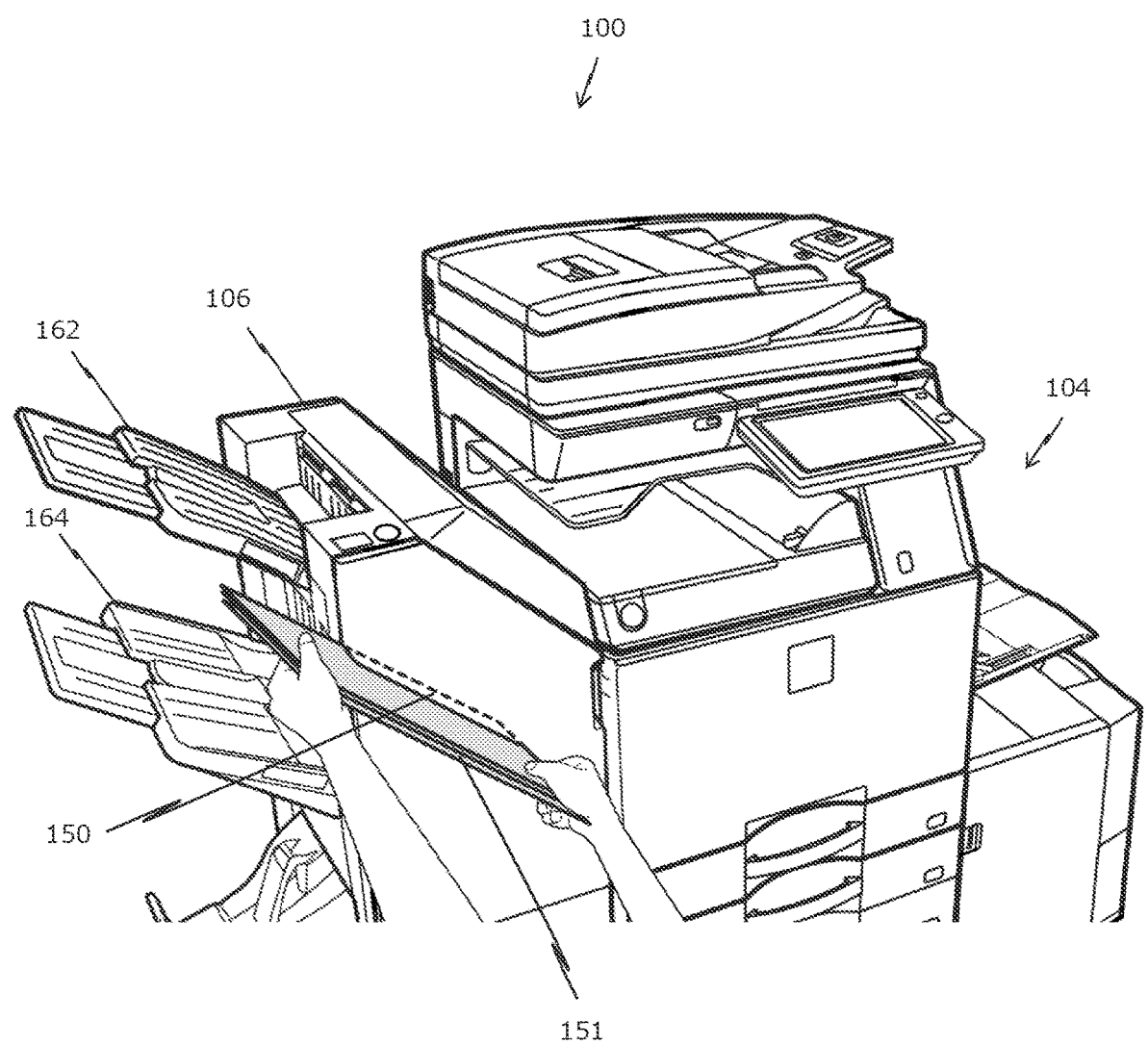
FIG. 3 is an explanatory view illustrating a situation where a sheet is inserted in a sheet insertion opening of the image forming apparatus illustrated in FIG. 1 for manual stapling.

As illustrated in FIG. 1 and FIG. 2, a multifunction peripheral 100 includes a power circuit 102, a body 104, and a finisher 106. The power circuit 102 supplies power to all of the body 104 and the finisher 106. The finisher 106 is provided with a sheet insertion opening 150. As illustrated in FIG. 3, when a user inserts a corner of a sheet 151 in the sheet insertion opening 150, a sheet detection circuit 152 in the finisher 106 detects a state where the sheet 151 is inserted. When the state where the sheet 151 is inserted continues for a predetermined period (two seconds in one example), a finisher controller 110 responds to detection thereof in a normal mode, activates a drive circuit 158, and actuates a staple mechanism 154. In this way, stapling processing is executed on the sheets 151 that have been inserted in the sheet insertion opening 150.

A description will be made on a configuration of the body 104. As illustrated in FIG. 2, the body 104 in this embodiment includes a body controller 10, a storage 20, an operation unit 30, a body communication circuit 40, an image forming unit 50, and a body paper transport mechanism 60. The body controller 10 is constructed of a processor and memory as central components, and includes a user interface controller 12, an image forming controller 14, and a power saving controller 16.

The storage 20 is configured to be accessible by the body controller 10 and is a combination of RAM and nonvolatile memory. As the RAM, Double-Data-Rate Synchronous Dynamic Random Access Memory (DDR SDRAM) such as DDR4 or DDR5 may be applied. As the nonvolatile memory, a solid-state disk (SSD) or a hard disk drive (HDD) may be applied.

The operation unit 30 is configured to include a display device, such as a liquid-crystal display (LCD) or an organic light-emitting display (OLED) that displays information on a state and an operation of the multifunction peripheral 100, and an input detection device, such as a touch panel, that detects the operation.

The body communication circuit 40 is constructed of communication circuits such as an in-machine serial communication circuit and Ethernet. The in-machine serial communication circuit such as of RS-422 handles communication with the finisher 106, and Ethernet handles communication with external devices.

The image forming unit 50 executes processing related to image data that is acquired by reading a document or that is acquired from the external device via the body communication circuit 40. Then, the image forming unit 50 executes processing to print the image data or output the image data to the external device. The image forming unit 50 is constructed of a mechanism, a device, a sensor, a circuit, and the like that are related to image processing. In the multifunction peripheral 100 according; to this embodiment, an image is formed and printed on paper by an electrophotographic method.

The body paper transport mechanism 60 is constructed of a mechanism as well as a device, a sensor, a circuit, and the like that are associated with the mechanism. When printing is executed, the mechanism feeds paper, on which the image formed by the image forming unit 50 is to be printed, transfers the formed image onto the paper, and transports the paper to the finisher 106.

The user interface controller 12 in the body controller 10 is an element that executes processing related to functions to provide information to the user via the operation unit 30 and accept the user's operation.

The image forming controller 14 is an element that executes processing related to control of the image forming unit 50 and the body paper transport mechanism 60 and processing related to image formation. The power saving controller 16 is an element that executes processing related to shifting from the normal mode to a power saving mode or processing related to shifting from the power saving mode to the normal mode. In conjunction with shifting of the mode, the power saving controller 16 executes control for supplying the power from the power circuit 102 to each component of the multifunction peripheral 100 or shutting off the power supply by controlling the power circuit 102. The power saving controller 16 also executes processing related to detection of a trigger that shifts the mode to the normal mode in the power saving mode.

Next, a description will be made on a configuration of the finisher 106. As illustrated in FIG. 2, the finisher 106 in this embodiment includes the finisher controller 110, a finisher communication circuit 140, the sheet detection circuit 152 provided to the sheet insertion opening 150, the staple mechanism 154, a saddle stitch mechanism 156, and the drive circuit 158. The finisher controller 110 communicates with the body controller 10 in the body 104 via the finisher communication circuit 140. Then, the finisher controller 110 controls operation of each device in the finisher 106, The finisher communication circuit 140 is constructed of an in-machine serial communication circuit such as of RS-422 that handles the communication with the body 104.

The sheet detection circuit 152 detects the sheet that has been inserted in the sheet insertion opening 150, and causes the finisher controller 110 to recognize the sheet.

The staple mechanism 154 is a mechanism that binds ends of the sheets with or without a staple. The staple mechanism 154 in this embodiment has a stapler (not illustrated). The stapler is driven by the drive circuit 158 that has a motor as a drive device. The finisher controller 110 executes stapling processing on the sheets by rotating the motor of the drive circuit 158 at a predetermined rotational frequency.

The stapler has: a mechanism that is freely movable from a front side where the sheet insertion opening 150 is present to a back side; and a drive device that moves the stapler. The finisher controller 110 moves the stapler to a position corresponding to a staple setting for a job. As the stapling processing in the job, for example, A is possible to set: two-position stapling in a back direction that is perpendicular to a sheet transport direction; one-position stapling at the end on the sheet back side; or one-position stapling at the end on the sheet front side.

In addition, the finisher controller 110 moves the stapler to the end on the front side when not in the job. When the sheet detection circuit 152 detects the insertion of the sheets in the sheet insertion opening 150, the finisher controller 110 operates the drive circuit 158 and executes the stapling processing on the one end of a set of the inserted sheets.

The saddle stitch mechanism 156 is not associated with the manual stapling function according to the present disclosure, but is a mechanism that performs saddle stitching or saddle stitch stapling for saddle-stitch paper-fold binding in the job.

A finisher paper transport mechanism 160 receives and transports the sheets that are output from the body 104, and then transports the sheets to a sheet receiving tray 162 or a sheet receiving tray 164 (see FIG. 1 and FIG. 3). The finisher paper transport mechanism 160 includes a shift mechanism that shifts, per copy, positions of the sheets to be discharged to the sheet receiving tray 162 or 164 in the back direction, for example.

Flowchart of Processing Related to Manual Stapling and Power Saving Control.

A description will be made on the processing related to the manual stapling and power saving control of the processing that is executed by the body controller 10. In particular, a description will be made on a procedure for handling a conflict between shifting to the power saving mode and the trigger of the manual stapling (an attempt to simultaneously execute these) without a contradiction.

Figure 4:
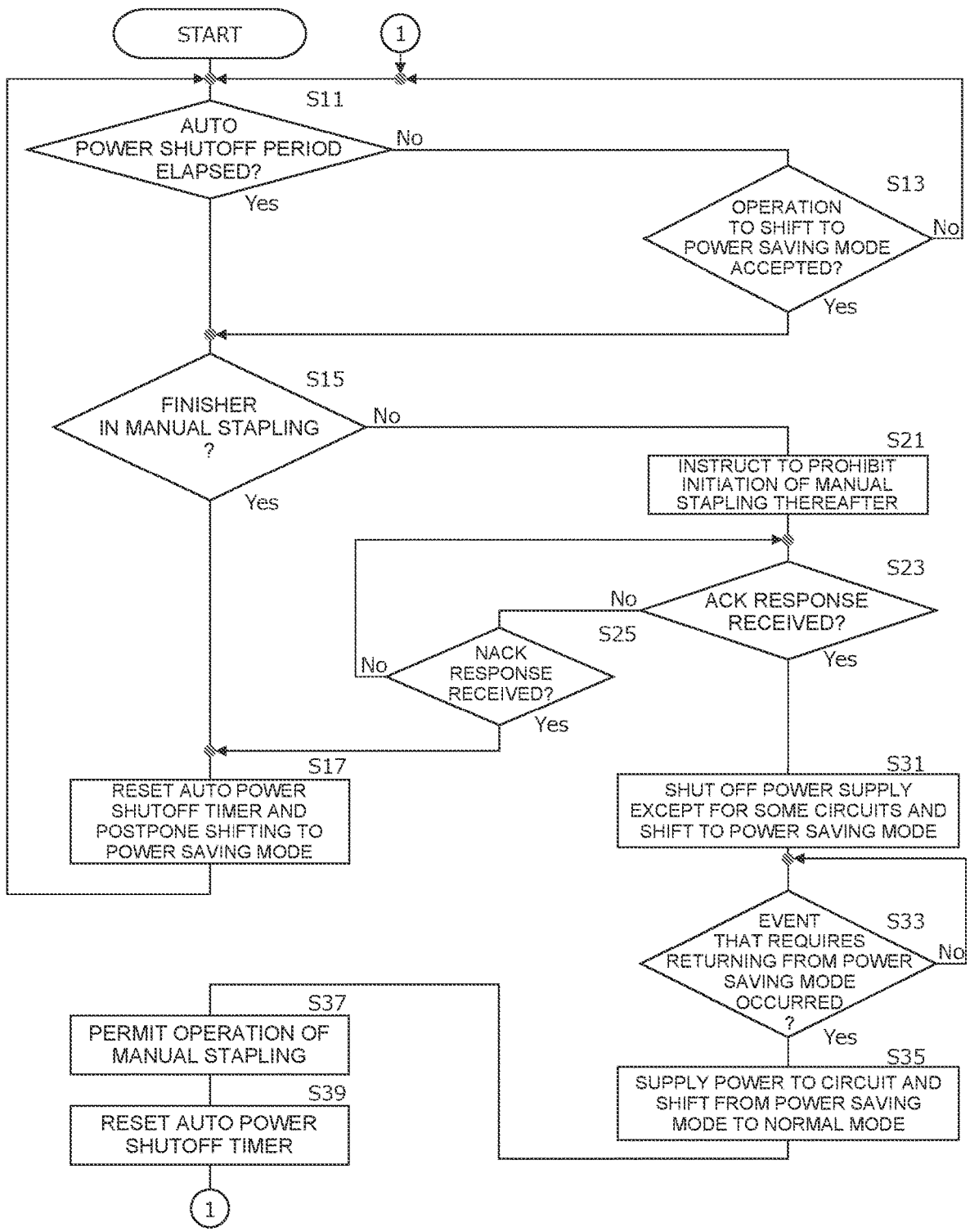
FIG. 4 is a flowchart illustrating an example of processing that is related to power saving control and the manual stapling and is executed by a body controller illustrated in FIG. 2, (First Embodiment)

FIG. 4 is a flowchart illustrating an example of the processing that is related to the power saving control and the manual stapling and is executed by the body controller 10 as the power saving controller 16 in this embodiment.

As illustrated in FIG. 4, the body controller 10 as the power saving controller 16 determines whether the multifunction peripheral 100 remains unused for a predetermined period related to auto power shutoff in the normal mode (step S11). In order to determine a lapse of an auto power shutoff period, the body controller 10 as the power saving controller 16 measures time by using a timer. The timer is a dedicated timer used to measure the lapse of the auto power shutoff period, and will hereinafter simply be referred to as the timer.

For example, at a time point when the normal mode is initiated, the power saving controller 16 sets the auto power shutoff period (five minutes as an example) on the timer and starts countdown of the timer. In addition, when an operation on the multifunction peripheral 100, such as an operation on the operation unit 30 or an operation to set the document, is accepted, the power saving controller 16 resets the auto power shutoff period (five minutes as the example) on the timer that has already started counting down.

In this way, the power saving controller 16 determines whether the multifunction peripheral 100 remains unused for the auto power shutoff period (whether the countdown of the timer has reached zero).

If the timer has not reached zero, that is, if the auto power shutoff period has not elapsed (No in step S11), it is subsequently determined whether an operation to shift to the power saving mode has been accepted (step S13). For example, it is determined whether a [Power Saving] button 31 provided to the operation unit 30 has been operated. If the operation to shift to the power saving mode has not been performed. (No in step S13), the processing returns to above-described step S11, and the body controller 10 monitors the lapse of the auto power shutoff period. If it is determined in step S11 that the auto power shutoff period has elapsed (Yes in step S11), the processing proceeds to step S15 below. Similarly, if it is determined in step S13 that the operation to shift to the power saving mode has been accepted (Yes in step S13), the processing proceeds to step S15.

In step S15, the body controller 10 as the power saving controller 16 communicates with the finisher controller 110 and determines whether the finisher 106 currently executes the manual stapling processing. A state of whether the finisher 106 currently performs the manual stapling may be acquired when the body controller 10 inquires of the finisher controller 110 about the state and receives a reply therefrom. Alternatively, the finisher controller 110 may inform the body controller 10 of a change in the state each time the manual stapling is started or terminated.

If the body controller 10 determines that the finisher 106 currently executes the manual stapling processing (Yes in step S15), the body controller 10 as the power saving controller 16 resets the auto power shutoff period on the timer. That is, timing to shift to the power saving mode is postponed at least for the auto power shutoff period (step S17). Then, the processing returns to step S11, and the body controller 10 as the power saving controller 16 monitors the lapse of the auto power shutoff period.

On the other hand, if the body controller 10 as the power saving controller 16 determines that the finisher 106 does not currently execute the manual stapling processing (No in step S15), the body controller 10 as the power saving controller 16 sends an instruction to prohibit the manual stapling to the finisher controller 110 (Step S21). This is to prevent the initiation of the manual stapling even when the sheet detection circuit 152 detects the sheets thereafter. Then, the body controller 10 as the power saving controller 16 waits for a response from the finisher controller 110 (a loop returning to step S23 via No in step S23 and No in step S25).

If the body controller 10 as the power saving controller 16 receives, from the finisher controller 110, an acknowledged (ACK) response to the instruction to prohibit the manual stapling (Yes in step S23), the processing proceeds to step S31, which will be described below.

If, instead of the ACK response (No in step S23), the power saving controller 16 receives a not-acknowledged KNACK) response from the finisher controller 110 (Yes in step S25), the processing proceeds to above-described step S17, and the power saving controller 16 resets the auto power shutoff period on the timer. In the case where the finisher controller 110 starts the manual stapling processing in a period from time at which the finisher controller 110 sends the response stating that the manual stapling is not currently performed as the response to the inquiry in step S15 to time at which the finisher controller 110 receives the instruction to prohibit the manual stapling, the finisher controller 110 sends the NACK response. Alternatively, in regard to the notification of the change in the state to the body side in step S15, the sheet detection circuit 152 detects the sheets, and the finisher controller 110 notifies of the state where the manual stapling is currently performed, but receives the instruction to prohibit the manual stapling. In such a case, the finisher controller 110 sends the NACK response.

In step S31, after receiving the ACK response, the body controller 10 as the power saving controller 16 shifts the mode of the multifunction peripheral 100 from the normal mode to the power saving mode. In detail, the power supply from the power circuit 102 to each of the circuits in the apparatus is shut off except for some of the circuits, Some circuits for which the power supply is maintained are the circuits that are involved in detection of an event that triggers return from the power saving mode to the normal mode. For example, the event that triggers the return is the operation of the [Power Saving] button 31 provided to the operation unit 30.

In the power saving mode, the body controller 10 as the power saving controller 16 monitors the event that triggers the return from the power saving mode to the normal mode (step S33). For example, the event that triggers the return is the operation of the [Power Saving] button 31 provided to the operation unit 30.

When the trigger event occurs (Yes in step S33), the body controller 10 as the power saving controller 16 executes processing to supply the power from the power circuit 102 to each of the circuits in the apparatus and shift the mode from the power saving mode to the normal mode (step S35).

Then, the body controller 10 as the power saving controller 16 may send, to the finisher controller 110, an instruction to permit manual stapling operation (step S37).

However, in the case where the finisher controller 110 does not store the instruction to prohibit the manual stapling that is sent before shifting to the power saving mode, the finisher controller 110 naturally accepts the manual stapling when the processing in the normal mode is initiated. Accordingly, in some cases, such as when the finisher controller 110 is powered off in the power saving mode, the manual stapling operation is substantially permitted even without sending the instruction to permit the manual stapling.

When returning to the normal mode, the body controller 10 as the power saving controller 16 sets the auto power shutoff period on the timer (step S39). Then, the processing returns to step S11, and it is determined whether the multifunction peripheral 100 remains unused for the auto power shutoff period (whether the countdown of the timer has reached zero).

In this embodiment, the description has been made on the example of the processing that is related to the power saving control and the manual stapling and is executed by the body controller 10 as the power saving controller 16.

As it has been described so far, if the auto power shutoff period has elapsed (if Yes in step S11), before shifting to the power saving mode (step S31), the finisher 106 determines whether the manual stapling processing is currently executed (step S15). Then, if the manual stapling is currently performed (Yes in step S15), shifting to the power saving mode is postponed (step S17). On the other hand, if the manual stapling is not currently performed (No in step S15), the subsequent manual stapling processing is prohibited. (step S21). In this way, it is possible to appropriately handle the conflict between shifting to the power saving mode and the trigger of the manual stapling (the attempt to simultaneously execute these).

Furthermore, the following case is also taken into consideration. The finisher controller 110 in the finisher 106 accepts the trigger of the manual stapling before the power saving controller 16 in the body 104 sends the instruction to prohibit the manual stapling as the result of the determination on whether the manual stapling is currently performed. In the case where the finisher controller 110 is instructed by the body controller 10 to prohibit the manual stapling immediately after the initiation of the manual stapling processing, the finisher controller 110 replies to the body controller 10 with the HACK response. In this way, it is possible to appropriately handle a conflict between the instruction to prohibit the manual stapling and the trigger of the manual stapling (the attempt to simultaneously execute these).

Communication Example of Processing Related to Manual Stapling and Power Saving Control In order to facilitate understanding; of the aspect of the present disclosure, a description will be made in time sequence on an example of communication between the body controller 10 and the finisher controller 110 about occurrence of the event in regard to the processing related to the manual stapling and the power saving control illustrated in FIG. 4.

Figure 5:
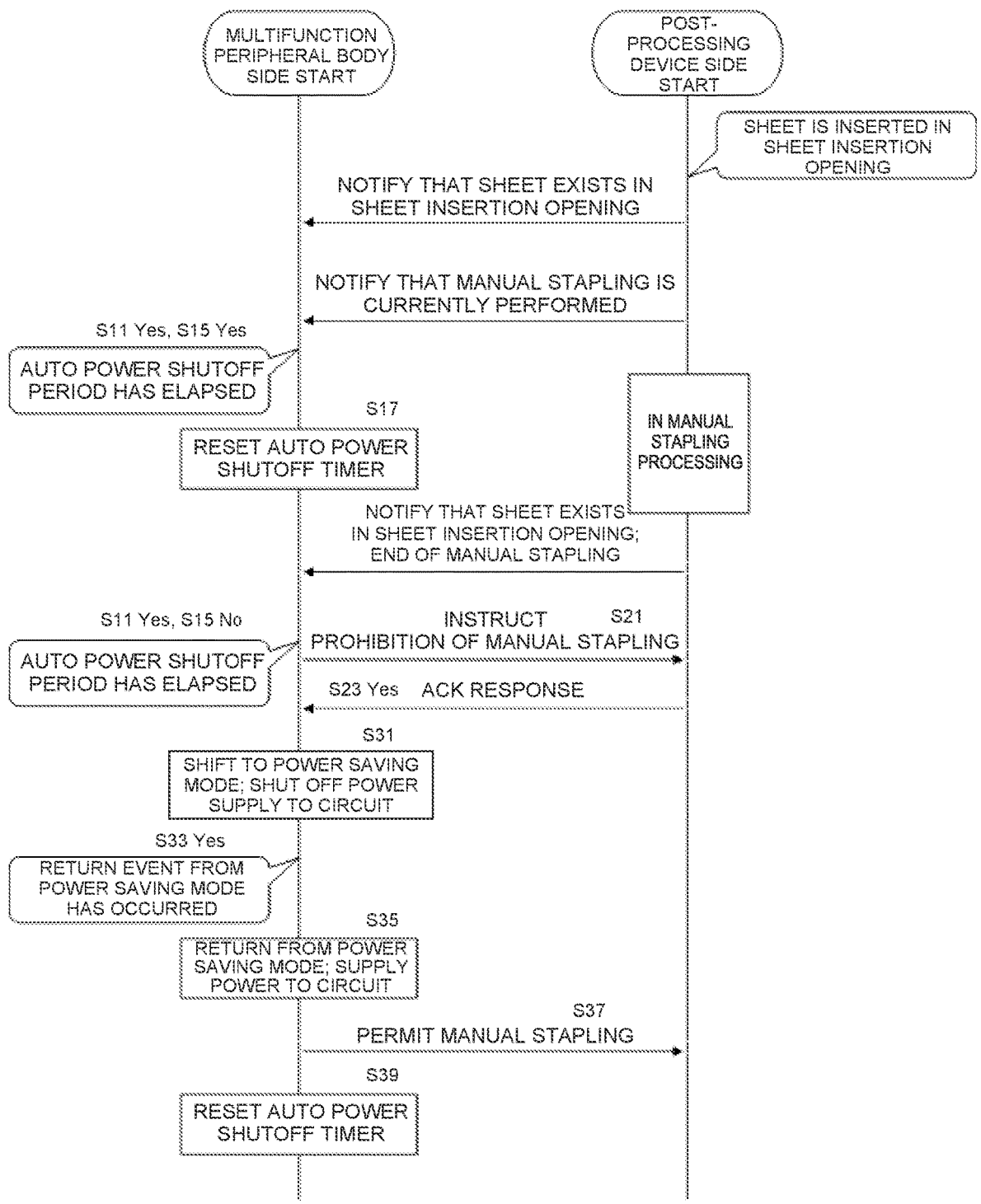
FIG. 5 is an explanatory chart illustrating a communication example related to the processing illustrated in the flowchart in FIG. 4.
Figure 6:
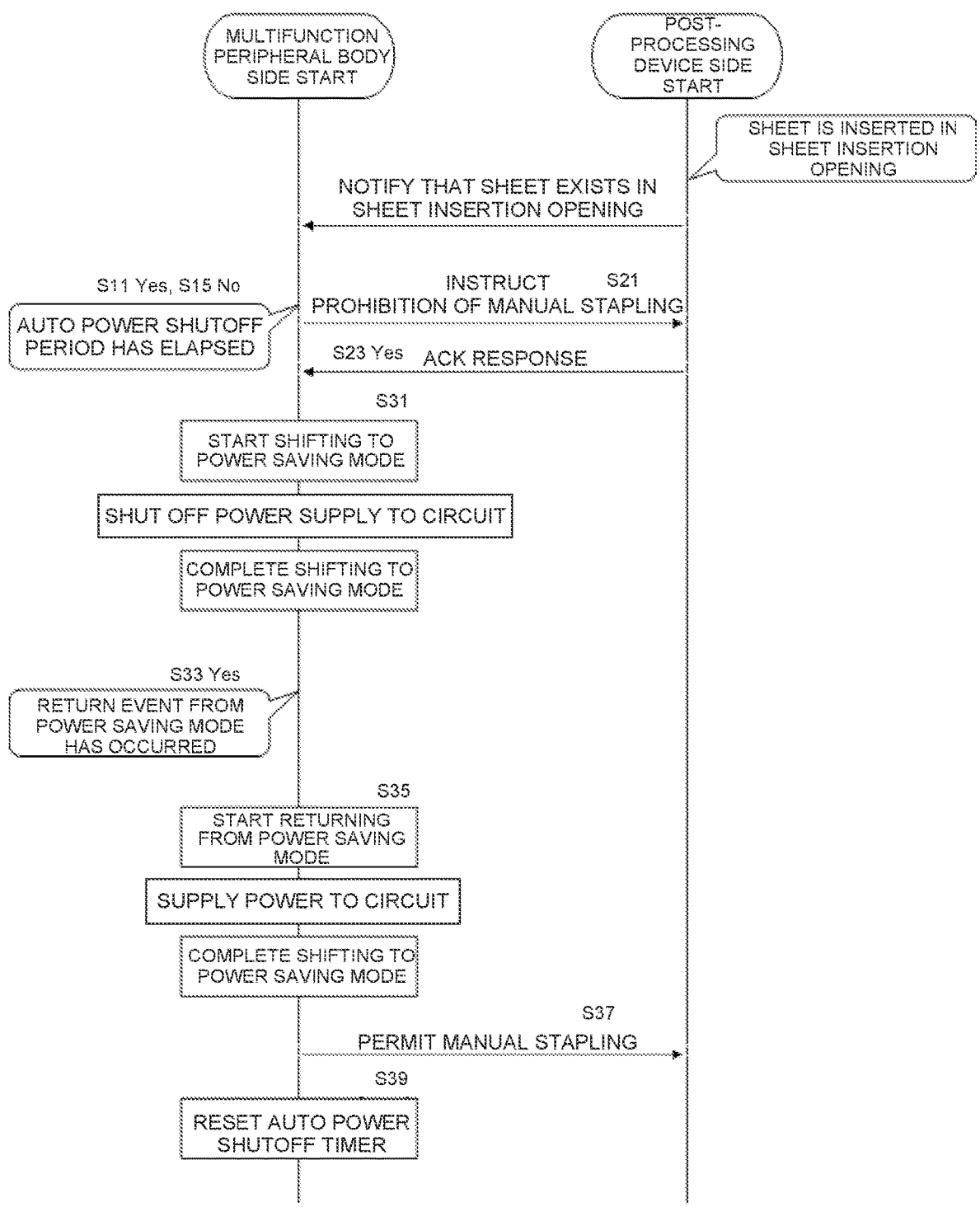
FIG. 6 is an explanatory chart illustrating an example in which an event occurs in a different pattern from that in FIG. 5.

FIG. 5 is an explanatory chart illustrating the communication example between the body controller 10 and the finisher controller 110 in regard to the processing illustrated in the flowchart in FIG. 4. FIG. 6 is an explanatory chart illustrating an example in which the event occurs in a different pattern from that in FIG. 5. In each of FIG. 5 and FIG. 6, events that occur in the body 104 and the processing executed by the body controller 10 are illustrated chronologically from top to bottom on a left side. On a right side, events that occur on the finisher side and the processing executed ley the finisher controller 110 are illustrated in a corresponding manner to the body 104. Portions corresponding to the processing in FIG. 4 are denoted by the corresponding processing numbers.

As illustrated in FIG. 5, when the sheets are inserted in the sheet insertion opening 150 of the finisher 106, the sheet detection circuit 152 in the finisher 106 detects the insertion. In response to the detection, the finisher controller 110 notifies the body controller 10 of the state where the sheets are present in the sheet insertion opening 150. When the sheets remain present for a predetermined period (two seconds as an example), the finisher controller 110 initiates the manual stapling processing and notifies the body controller 10 that the manual stapling is currently performed. In the example illustrated in FIG. 5, on the body 104 side that receives, from the finisher 106, the notification that the manual stapling is currently performed, such a case is illustrated where the power saving controller 16 recognizes that the timer measuring the lapse of the auto power shutoff period has reached zero immediately thereafter. Such a case corresponds to the event where it is determined Yes in step S11 in FIG. 4.

In this case, the result of the determination on whether the finisher 106 currently performs the manual stapling (the determination in step S15 in the processing illustrated in FIG. 4) is Yes. The power saving controller 16 resets the auto power shutoff period on the timer to postpone shifting to the power saving mode (step S17).

Eventually, when the manual stapling is terminated on the finisher 106 side, the finisher controller 110 notifies the body controller 10 of the termination of the manual stapling. In this example, the finisher 106 is assumed to lie in any of three states in regard to the manual stapling. A first state is a state where the sheets are absent in the sheet insertion opening. A second state is a state where the sheets are present in the sheet insertion opening. When such a state continues for a predetermined period (two seconds as an example), the finisher controller 110 initiates the manual stapling. In conjunction therewith, the state shifts to a third state where the manual stapling is currently performed. When the manual stapling is terminated, the state shifts to the first or second state. However, the sheets are not immediately removed from the sheet insertion opening even after the manual stapling is terminated. Accordingly, after the manual stapling is terminated in the example illustrated in FIG. 5, the finisher controller 110 notifies the body controller 10 of the state where the sheets are present in the sheet insertion opening.

On the body 104 side, it is thereafter assumed that the postponed auto power shutoff period has elapsed. Prior to shifting to the power saving mode, the power saving controller 16 in the body 104 determines whether the manual stapling is currently performed. (the determination in step S15 in the processing illustrated in FIG. 4). At this time, the finisher 106 does not perform the manual stapling (No in step S15 in FIG. 4). Accordingly, the power saving controller 16 sends, to the finisher controller 110, the instruction to prohibit the manual stapling (step S21 illustrated in FIG. 4). In the example illustrated in FIG. 5, in response thereto, the finisher controller 110 replies with the ACK response. When receiving the ACK response (Yes in step S23 illustrated in FIG. 4), the power saving controller 16 in the body 104 executes the processing to shift the mode to the power saving mode, and shuts off the power supply to each of the sections including the finisher 106 (step S31 illustrated in FIG. 4).

In the case where the [Power Saving] button 31 is operated in the power saving mode, and the trigger to the normal mode is detected (yes in step S33 in FIG. 4), the power saving controller 16 resumes the power supply that has been shut off, and executes the processing to shift to the normal mode (step S35 in FIG. 4). Upon return to the normal mode, the manual stapling is permitted (step S37), and the timer is reset to the auto power shutoff period (step S39). The description has been made so far on the example of the case where the trigger of the manual stapling and the processing related to shifting to the power saving mode conflict each other and shifting to the power saving mode is slightly delayed.

In contrast, FIG. 6 illustrates an example of a case where the trigger of the manual stapling and the processing related to shifting to the power saving mode conflict each other but shifting to the power saving mode occurs slightly early.

In the example illustrated in FIG. 6, similar to FIG. 5, when the sheet is inserted in the sheet insertion opening 150 of the finisher 106, the finisher controller 110 notifies the body controller 10 of the state where the sheets are present in the sheet insertion opening. When the sheets remain present for the predetermined period (two seconds as an example), the finisher controller 110 initiates the manual stapling processing and notifies the body controller 10 that the manual stapling is currently performed.

In the example illustrated in FIG. 6, the body 104 side determines that the auto power shutoff period has elapsed immediately before receiving, from the finisher 106, the notification that the manual stapling is currently performed. That is, the timer that measures the lapse of the auto power shutoff period reaches zero immediately before reception of the notification that the manual stapling is currently performed. The power saving controller 16 that recognizes such a fact sends, to the finisher controller 110, the instruction to prohibit the manual stapling (step S21 illustrated in FIG. 4).

In response to the instruction to prohibit the manual stapling, the finisher controller 110 replies with the ACK response (Yes in step S23 illustrated in FIG. 4).

When receiving the ACK response, the power saving controller 16 shifts the mode of the multifunction peripheral 100 from the normal mode to the power saving mode, and shuts off the power supply from the power circuit 102 to each of the circuits in the peripheral (step S31).

The processing to detect the trigger and return to the normal mode thereafter is the same as that in FIG. 5.

In the case where the finisher controller 110 receives the instruction to prohibit the manual stapling and replies with the NACK response, similar to FIG. 5, the power saving controller 16 resets the auto power shutoff period on the timer and postpones shifting to the power saving mode (step S17).

Second Embodiment

Figure 7:
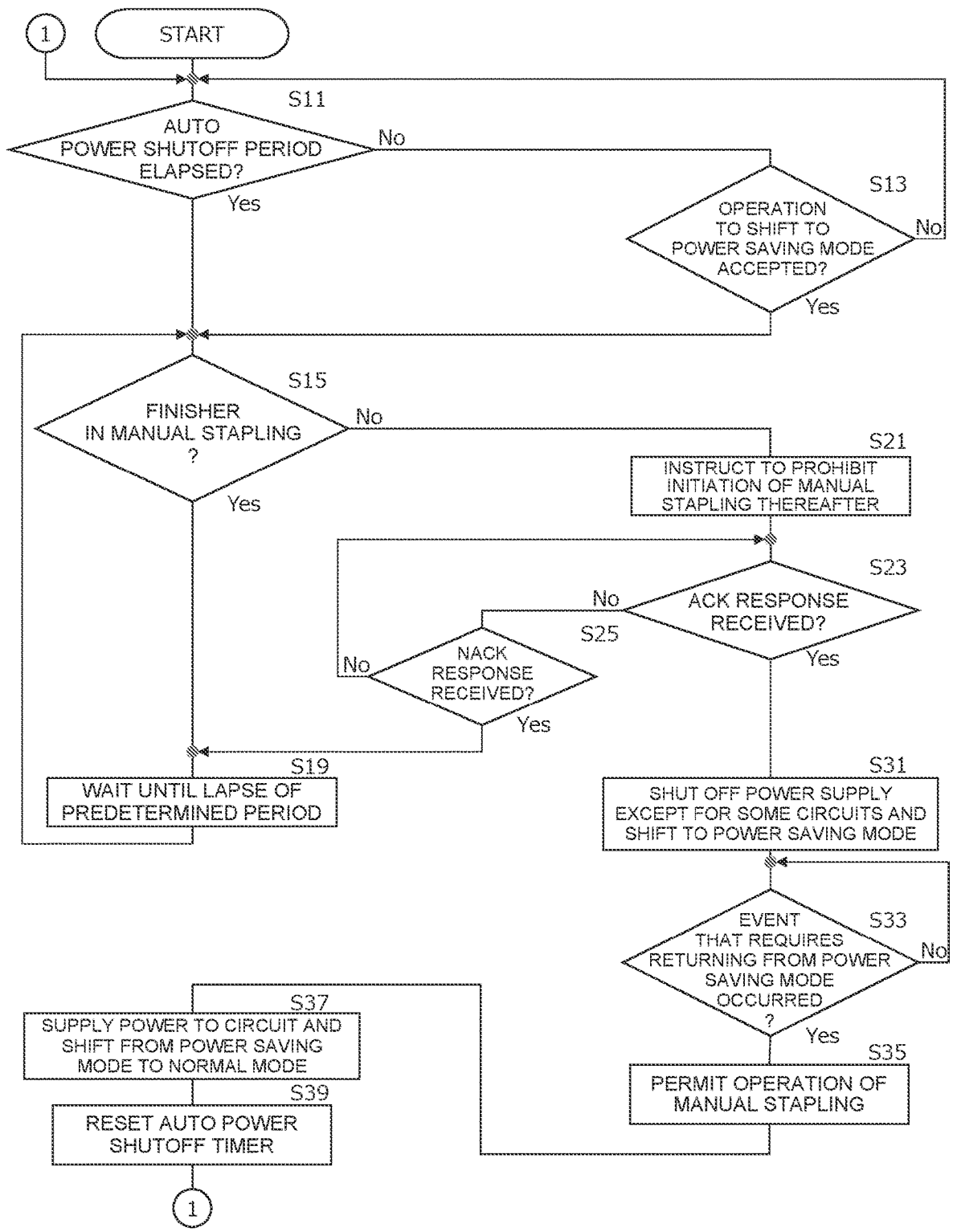
FIG. 7 is a flowchart illustrating processing that is related to the power saving control and the manual stapling and is executed by the body controller illustrated in FIG. 2. (Second Embodiment)

FIG. 7 is a flowchart illustrating an example of the processing that is related to the power saving control and the manual stapling and is executed by the body controller in this embodiment, and is a chart corresponding to FIG. 4 in the first embodiment.

In the first embodiment, in the flowchart illustrated in FIG. 4, after the lapse of the auto power shutoff period (Yes in step S11), the power saving controller 16 determines whether the finisher 106 currently performs the manual stapling (step S15). If the finisher 106 currently performs the manual stapling (Yes in step S15), the auto power shutoff period (five minutes as an example) is reset on the timer to postpone shifting to the power saving mode (step S17).

In this embodiment, instead of the processing in step S17 in FIG. 4 to reset the auto power shutoff period on the timer, as illustrated in FIG. 7, the power saving controller 16 only waits for a predetermined period (ten seconds as an example) (step S19), and then determines whether the finisher 106 currently executes the manual stapling processing. The predetermined period is assumed to be longer than a period between the initiation and the termination of the manual stapling processing and shorter than the auto power shutoff period.

Accordingly, the period for which shifting to the power saving mode is postponed due to the current execution of the manual stapling processing is shorter than that in the first embodiment.

The rest of the processing illustrated in FIG. 7 is the same as that in the flowchart illustrated in FIG. 4.

That is, in this embodiment, the power saving controller 16 treats the manual stapling processing as independent processing from a factor that causes resetting of the auto power shutoff period on the timer. While the factor that causes resetting of the auto power shutoff period on the timer is the operation related to the job of the multifunction peripheral 100, the manual stapling is considered to be separate, asynchronous processing from the job. Thus, even in the case where the manual stapling is performed, shifting to the power saving mode is not postponed unless the manual stapling interferes with shifting to the power saving mode.

Figure 8:
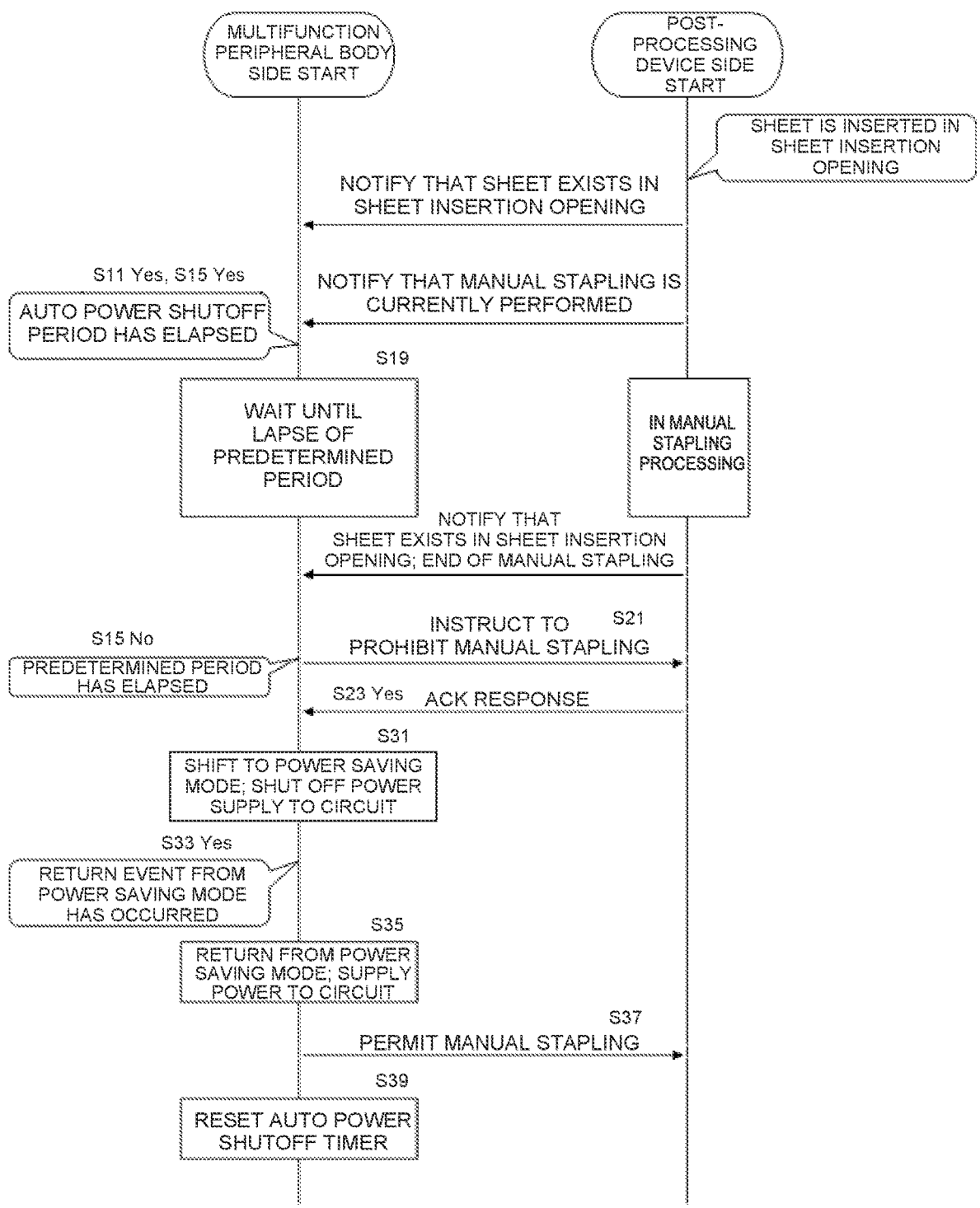
FIG. 8 is an explanatory chart illustrating a communication example related to the processing illustrated in the flowchart in FIG. 7.

FIG. 8 is an explanatory chart illustrating a communication example between the body controller 10 and the finisher controller 110 in this embodiment, and corresponds to FIG. 5 in the first embodiment.

FIG. 8 differs from FIG. 5 in regard to the processing that is denoted by step S1.9 in parentheses. That is, instead of the processing to reset the auto power shutoff period on the timer, which corresponds to step 417 in FIG. 5, the power saving controller 16 only waits for the predetermined period, and then determines whether the finisher 106 currently executes the manual stapling processing.

Third Embodiment

In the first embodiment, such a configuration has been described that the finisher controller 110 cooperates with the body controller 10 while communicating therewith. As a different aspect, it is considered to adopt an aspect in which the finisher controller 110 is included in the body controller 10 and is one (or a plurality) of tasks executed by the body controller 10.

According to such an aspect, instead of the finisher communication circuit 140, an input/output signal line to each of the components in the finisher 106 is connected to the body 104. However, in the body controller 10, the task corresponding to the finisher controller 110 communicates and cooperates with another task.

Those skilled in the art will easily understand the configuration that the finisher controller 110 is included in the body controller 10 from FIG. 2.

As it has been described so far, (i) the image forming apparatus according to the present disclosure includes: the post-processor including the sheet detection circuit that detects the sheet inserted in the sheet insertion opening for the manual stapling, the staple mechanism that executes the stapling processing on the sheet, and the drive circuit that actuates the staple mechanism; the post-processing controller that operates the drive circuit in response to the detection of the sheet; the power circuit that supplies the power to the drive circuit and the other circuits in the apparatus; and the power saving controller that shuts off the power supply from the power circuit to the drive circuit and the other circuits in the apparatus and shifts from the normal mode to the power saving mode when the predetermined shifting condition is satisfied. Prior to shifting from the normal mode to the power saving mode, the power saving controller checks the post-processing controller whether the stapling processing is currently executed. Then, in the case where the stapling processing is not currently executed, the power saving controller instructs the prohibition of the stapling processing and shifts to the power saving mode.

In the present disclosure, the manual stapling function is to staple the sheets when the user inserts the sheets in the sheet insertion opening. The power saving mode is the mode in which the power supply to the circuits in the apparatus is shut off except for some circuits that are required to detect the trigger to return to the normal mode, which will be described below, so as to suppress power consumption. In contrast, the normal mode is the mode in which the power is supplied to the circuits in the apparatus and the processing related to the image formation can be executed.

Furthermore, the stapling processing is the processing to bind a stack of the plural sheets and is not limited to that using the staple. An example of the specific aspect is the processing to pierce and bind the stack of the sheets with a metal staple. In recent years, such stapling processing is available in which, instead of using the staple, a U-shaped incision is made to the stack of the sheets and the U-shaped portions are folded back, for example.

Furthermore, a description will be made on preferred aspects of the present disclosure.

(ii) In the case where the post-processor currently executes the stapling processing as the result of checking, the power saving controller may suspend shifting to the power saving mode until completion of the stapling processing.

According to this aspect, even in the case where the post-processor executes the stapling processing at the time of checking prior to shifting to the power saving mode, shifting to the power saving mode is suspended until the stapling processing is completed. Therefore, it is possible to appropriately handle the conflict between shifting to the power saving mode and the trigger of the manual stapling.

(iii) The power saving controller may initiate shifting to the power saving mode after receiving, from the post-processor side, an approval response to the instruction to prohibit the stapling processing. In the case where the power saving controller receives a disapproval response to the instruction, the power saving controller may delay shifting to the power saving mode.

According to this aspect, in the case where the post-processor initiates the stapling processing and replies with the disapproval response when the instruction to prohibit the stapling processing is sent, shifting to the power saving mode is delayed. In this way, it is possible to appropriately handle the conflict between shifting to the power saving mode and the trigger of the manual stapling.

(iv) When a predetermined return condition is satisfied, the power saving controller may start the power supply and shift from the power saving mode to the normal mode. Then, when the power is supplied and the drive circuit can be operated, in response to the detection of the sheet by the sheet detection circuit, the power saving controller may actuate the staple mechanism.

According to this aspect, the stapling processing, which has been prohibited during shifting to the power saving mode, can be accepted by resuming the detection of the trigger after the mode returns from the power saving mode and the drive circuit can be operated.

(v) The power saving controller includes the timer. Upon the return to the normal mode or detection of a certain operation, the power saving controller may set a predetermined stand-by duration on the timer to start measuring time. Then, when the sheet is detected by the sheet detection circuit, the power saving controller may reset the stand-by duration on the timer After the timer finishes measuring the time, the power saving controller may inquire of the post-processor about whether the stapling processing is currently executed, and may thereafter shift to the power saving mode.

According to this aspect, when the sheet detection circuit detects the sheet, the manual stapling is executed, and the stand-by duration is set on the timer and is initialized. In this way, shifting to the power saving mode can be postponed.

(vi) The power saving controller includes the timer. Upon the return to the normal mode or the detection of the certain operation, the power saving controller may set the predetermined stand-by duration on the timer to start measuring time. Then, when the sheet is detected by the sheet detection circuit, the power saving controller may extend time of termination of time measurement by a predetermined period. After the timer finishes measuring the time, the power saving controller may inquire of the post-processor about whether the stapling processing is currently executed, and may thereafter shift to the power saving mode.

According to this aspect, when the sheet detection circuit detects the sheet, the manual stapling is executed, and the time of termination of the time measurement for the stand-by duration is extended by the predetermined period. In this way, shifting to the power saving mode can be postponed. The predetermined period can be selected independently of the stand-by duration.

(vii) An aspect of the present disclosure includes a power saving control method for the image forming apparatus, power saving control method causing the controller of the image forming apparatus having the manual stapling function to: detect the sheet inserted in the sheet insertion opening for the manual stapling; drive the drive circuit and execute the stapling processing on the sheet in response to the detection of the sheet; shut off the power supply to the drive circuit and the other circuits in the apparatus to shift from the normal mode to the power saving mode when the predetermined shifting condition is satisfied; prior to shifting from the normal mode to the power saving mode, check the post-processing controller whether the stapling processing is currently executed; and instruct the prohibition of the stapling processing and shift to the power saving mode in the case where the stapling processing is not currently executed as the result of checking.

The aspects of the present disclosure include combinations of any of the above-described plural aspects.

Various modifications can be made to the present disclosure in addition to the above-described embodiments. Those modifications should not be construed as falling outside the scope of the present disclosure. The present disclosure is embodied by the claims and their equivalents, and should embrace all modifications within the scope of the claims.

What is claimed is:

1. An image forming apparatus comprising:
   a post-processor including:
      a sheet detection circuit that detects a sheet inserted in a sheet insertion opening for manual stapling;
      a staple mechanism that executes stapling processing on the sheet; and
      a drive circuit that actuates the staple mechanism;
   a post-processing controller that operates the drive circuit in response to detection of the sheet;
   a power circuit that supplies power to the drive circuit and another circuit in the apparatus; and
   a power saving controller that shuts off a power supply from the power circuit to the drive circuit and the other circuit in the apparatus and shifts the apparatus from a normal mode to a power saving mode when a predetermined shifting condition is satisfied, wherein
   when the staple mechanism is driven, the post-processing controller notifies the power saving controller of conditions of the stapling processing,
   when the shifting condition from the normal mode to the power saving mode is satisfied, the power saving controller determines, on a basis of a notification received from the post-processing controller, whether the post-processor is in the conditions of the stapling processing, and when the power saving controller determines that the post-processor is not in the conditions of the stapling processing, the power saving controller instructs the post-processing controller to prohibit the stapling processing and to shift the apparatus to the power saving mode.

2. The image forming apparatus according to claim 1, wherein
   when the power saving controller determines that the post-processor is in the conditions of the stapling processing, the power saving controller suspends the shifting of the apparatus to the power saving mode until completion of the stapling processing.

3. The image forming apparatus according to claim 1, wherein
   the power saving controller initiates the shifting of the apparatus to the power saving mode after receiving, from the post-processor side, an approval response to an instruction received from the power saving controller to prohibit the stapling processing, and in a case where the power saving controller receives a disapproval response to the instruction, the power saving controller delays the shifting of the apparatus to the power saving mode.

4. The image forming apparatus according to claim 1, wherein
   when a predetermined return condition is satisfied, the power saving controller starts the power supply and shifts the apparatus from the power saving mode to the normal mode, and then, when the power is supplied and the drive circuit is operable, in response to the detection of the sheet by the sheet detection circuit, the power saving controller actuates the staple mechanism.

5. The image forming apparatus according to claim 4, wherein
   the power saving controller includes a timer,
   sets a predetermined stand-by duration on the timer to start measuring time upon return to the normal mode or detection of a certain operation,
   resets the stand-by duration on the timer when the sheet is detected by the sheet detection circuit, and
   after the timer finishes measuring the time, inquires the post-processor about whether the stapling processing is currently executed and thereafter shifts the apparatus to the power saving mode.

6. The image forming apparatus according to claim 4, wherein
the power saving controller includes a timer,
sets a predetermined stand-by duration on the timer to start measuring time upon return to the normal mode or detection of a certain operation,
extends time of termination of time measurement by a predetermined period when the sheet is detected by the sheet detection circuit, and after the timer finishes measuring the time, inquires the post-processor about whether the stapling processing is currently executed and thereafter shifts the apparatus to the power saving mode.

7. A power saving control method for an image forming apparatus, the power saving control method executing processing when a body controller of a body of the apparatus that interacts with a post-processing controller of a post-processor having a manual stapling function shifts the apparatus to a power saving mode, the power saving control method comprising:

receiving, while manual stapling is performed, a notification regarding conditions of stapling processing from the post-processing controller that executes the stapling processing on a sheet in response to detection, by the post-processor, of the sheet inserted in a sheet insertion opening for the manual stapling;

shutting off a power supply to a drive circuit and another circuit in the apparatus to shift the apparatus from a normal mode to a power saving mode when a predetermined shifting condition is satisfied;

when the shifting condition from the normal mode to the power saving mode is satisfied, determining whether the post-processor is in the conditions of the stapling processing on a basis of receiving the notification from the post-processing controller; and instructing prohibition of the stapling processing and shifting the apparatus to the power saving mode when the post-processor is determined not to be in the conditions of the stapling processing.

* * * * *